INVENTOR.
THOMAS J. THOMPSON

Aug. 5, 1952 T. J. THOMPSON 2,606,066
AUTOMATIC FLOW REGULATOR
Filed April 3, 1947 4 Sheets-Sheet 4

INVENTOR.
THOMAS J. THOMPSON
BY
ATTORNEY

Patented Aug. 5, 1952

2,606,066

UNITED STATES PATENT OFFICE 2,606,066

AUTOMATIC FLOW REGULATOR

Thomas J. Thompson, South Bend, Ind., assignor to Bendix Aviation Corporation, South Bend, Ind., a corporation of Delaware Application April 3, 1947, Serial No. 739,203

7 Claims. (Cl. 299—58)

This invention relates to automatic flow regulators for insuring proper distribution of a fluid such as liquid fuel to a plurality of discharge points or elements, as in the copending application of Robert H. Peterson and Frank C. Mock, Serial No. 723,492, filed January 22, 1947; and an object of the same is to improve such regulators and adapt the same to fuel feeding systems for gas turbines and like power plants wherein fuel from a common source is delivered to one or more combustion chambers or burners through a header or manifold and a series of discharge or spray nozzles.

The foregoing and other objects and advantages will become apparent in view of the following description taken in conjunction with the drawings, wherein.

Figure 1:
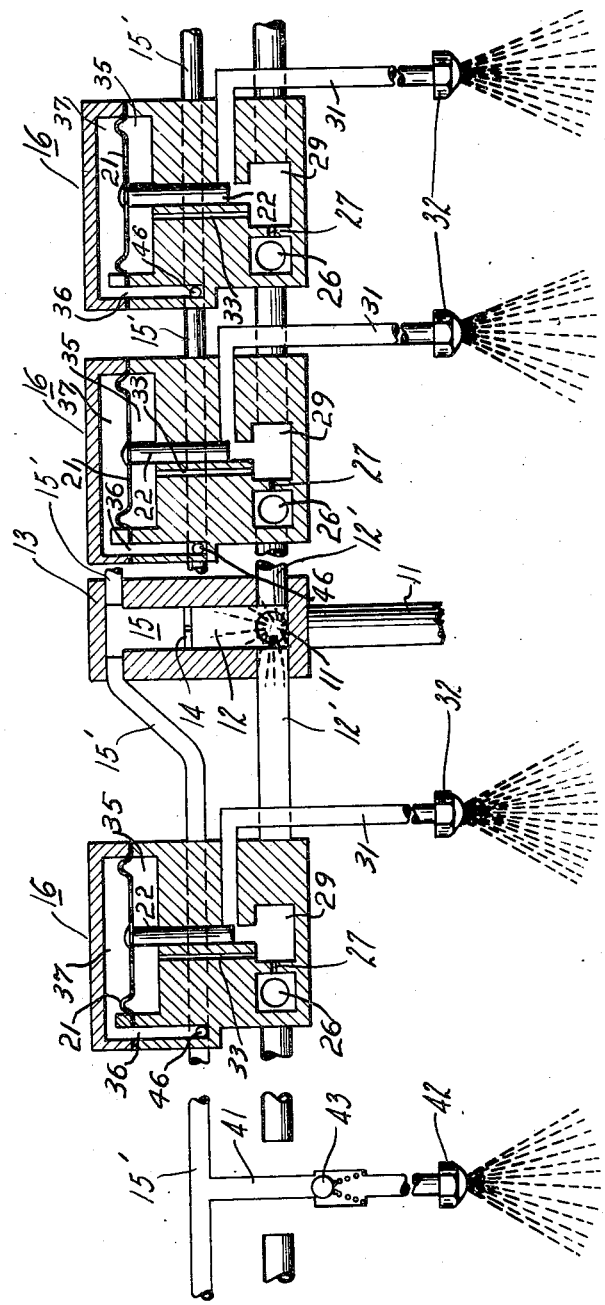
Figure 1 is primarily a schematic view of an automatic flow regulating or distributing system in accordance with the invention.
Figure 2:
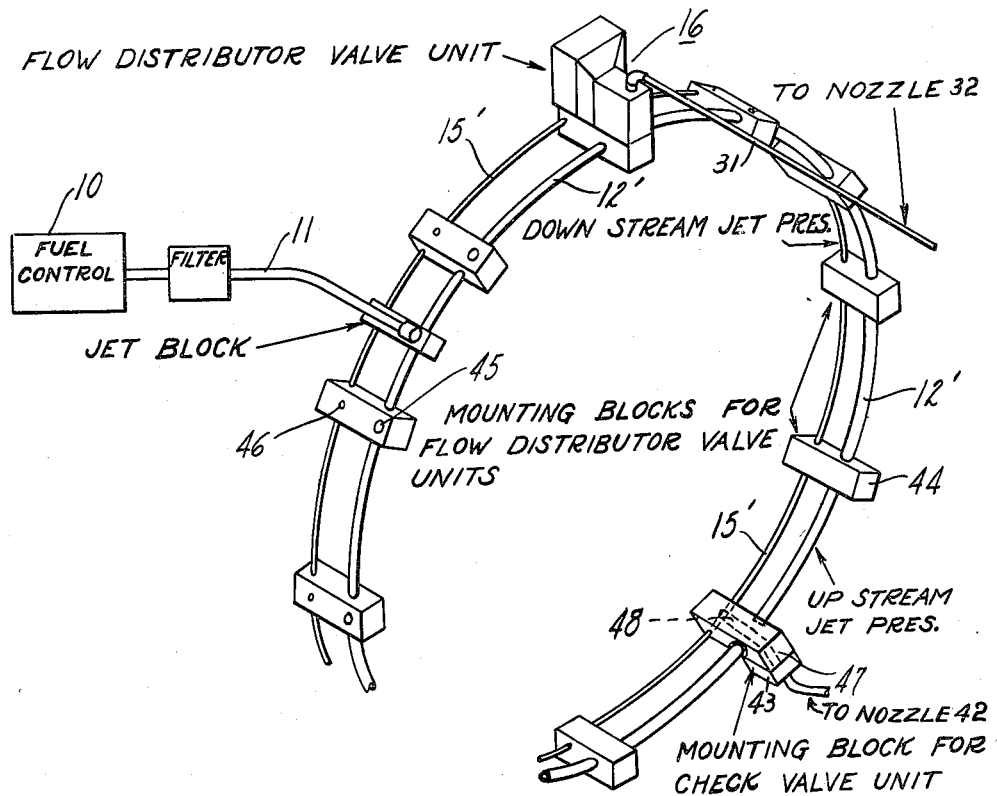
Figure 2 is another schematic view, illustrating how the system may be installed on a fuel manifold for a gas turbine.

Referring first to Figures 1 and 2, the fuel to be regulated may be taken from any suitable source, such as a supply tank, not shown, and supplied under pressure by suitable means such as a conventional pump also not shown, to a fuel control unit diagrammatically illustrated at 10, from whence it flows through a conduit 11 to the chamber 12 of a so-called jet block 13 and from this chamber part of the fuel flows to a main fuel manifold 12' while the remainder flows through a jet 14 to a chamber 15, also formed in the jet block 13, and thence to a manifold 15' which may be smaller or of less flow capacity than the main fuel manifold 12'. The jet 14 may be considered a pilot jet, since it determines the regulating pressure for a group of pressure regulating valves, three of which are shown in Figure 1 and indicated at 16. These valves may be of similar construction and a description of one should therefore suffice for all.

Figure 3:
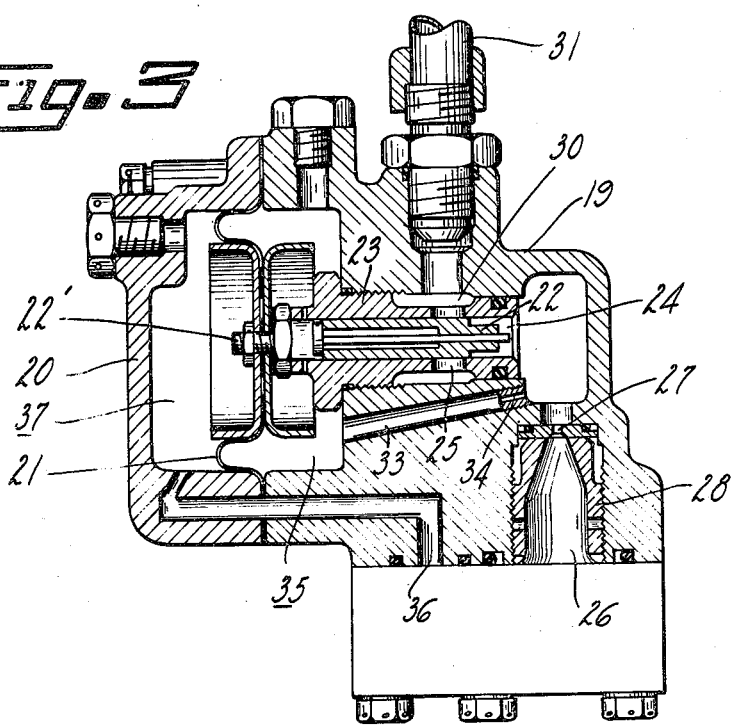
Figure 3 is a cross section through one of the pressure regulating valves shown schematically in Figure 1.
Figure 4:
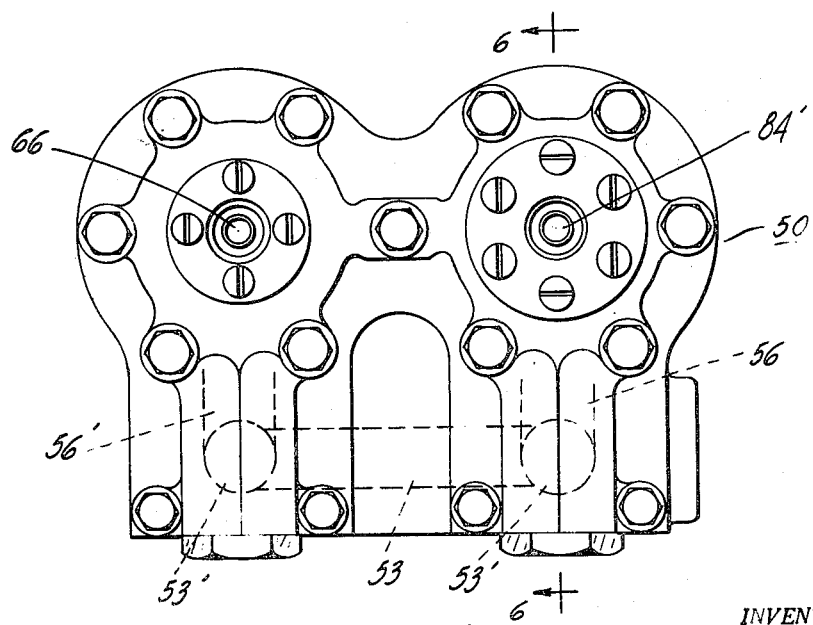
Figures 4 and 5 are elevational views of a modified form of flow distributor wherein a single valve assembly or unit is designed to regulate flow to any desired number of discharge nozzles.
Figure 5:
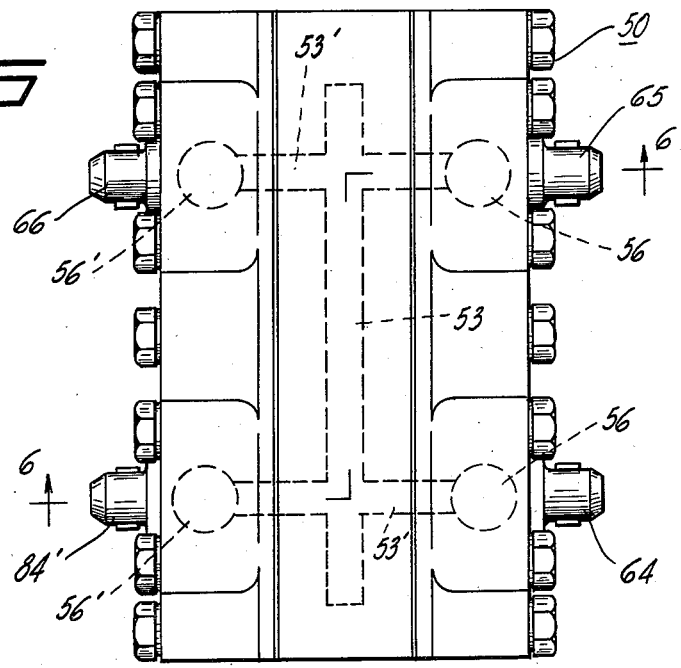

Referring to the sectional view in Figure 3 in conjunction with the diagram of Figure 1, each valve assembly comprises a housing made up of a body member 19 and a cap or cover 20, between which the peripheral portion of a diaphragm 21 is clamped, the central portion of said diaphragm being suitably connected to the stem 22' of a valve 22 mounted to reciprocate in a bushing 23 provided with an inlet passage 24 leading to a discharge port 25. Fuel enters by way of a passage 26 having mounted therein a jet 27 which is held in place by a bushing 28. Upstream of the jet 27 is a valve chamber 29 from which the fuel may flow by way of the passage 24 and port 25 to a chamber 30 and thence by way of conduit 31 to a discharge nozzle 32, Figure 1. Fuel in the chamber 29 may also flow by way of passage 33, having a removable jet or orifice 34 therein, to a pressure chamber 35 where it acts on the diaphragm 21 in a direction tending to open the valve 22.

Fuel from the manifold 15' flows by way of passage 36 to a pressure chamber 37 which overlies the diaphragm 21 and urges the latter in a direction tending to close the valve 22.

The fuel in manifold 15', in addition to providing a regulating pressure in the chamber 37 of each regulating valve, flows by way of a conduit 41, Figure 1, to a discharge nozzle 42, said conduit 41 having a check valve 43 mounted therein, which also has in effect a regulating function; it is not shown in detail but may be generally similar to the regulating valve of Figure 3 except that the passage 36 would be eliminated, a new passage connecting passage 31 or chamber 30 to chamber 37 provided and a spring mounted over the diaphragm 21 to assist pressure from passage 31 or chamber 30 in urging the check valve toward closed position. This valve 43 provides the necessary operating pressure across the valves 22, and is preferably adjustable to obtain a predetermined range of such pressure.

Figure 2 shows a method of mounting the respective flow regulating units or valves 16 on the manifolds 12' and 15', which in this instance are of annular or ring shape for supplying fuel to the burner system of a gas turbine. A series of mounting blocks 44 are suitably located in spaced relation and secured on the manifolds and are formed with ports or passages 45 and 46 adapted to register with the passages 26 and 36, respectively, of each valve unit as shown in Figure 3. One of the blocks, indicated at 47, is adapted for the check valve 43 and is formed with a single port 48 communicating the manifold 15' with the conduit 41 of Figure 1, the said block being closed off from the manifold 12'.

*Operation*

In conventional fuel supply systems for gas turbine engines, the fuel is usually metered into a manifold such as that indicated at 12', from which it flows to the various discharge nozzles. The burner system may be made up of a series of individual burners or generators with a spray nozzle for each burner chamber, or it may comprise a single annular burner chamber supplied with fuel from a plurality of spray or discharge nozzles. Since the nozzles are constructed to discharge the fuel under pressure in atomized form, dimensional and frictional effects are introduced in nozzle design and operation which render equal distribution of fuel to the burner chambers or chamber more or less difficult; also, should one nozzle become clogged or for some other reason discharge fuel at a rate inconsistent with the remaining nozzles, the flow to the entire series of nozzles would become disturbed or unbalanced.

In the herein disclosed system, the metered fuel from the fuel control unit 10 flows through the conduit 11 to the chamber 12 of the jet block 13, note Figures 1 and 2, from which point the main bulk of the fuel flows to the manifold 12' and thence through the individual passages or ports 45 in the mounting blocks 44 to the respective passages 26 of the flow distributor valve units 16 and through the jets 27 to the respective valve chambers 29. From the chambers 29, the fuel flows through the valve ports 25 to the valve chambers 30 (Figure 3), and then to the discharge nozzles through the respective branch conduits 31. Downstream jet fuel pressure is transmitted to the chambers 35 on one side of the diaphragms 21 through the passages 33, and acts on the diaphragms in a direction tending to open the valves 22.

The manifold 12' may be considered as having a plurality of flow passages branching therefrom and terminating at individual points of discharge, viz. the nozzles 32 and 41. The passages 26, chambers 29 and conduits 31 constitute all but one of these branch passages, the remaining passage consisting of the upper part of chamber 12, chamber 15, small manifold 15' to conduit 41, and thence to nozzle 42.

A portion of the fuel in the chamber 12 of the jet block 13 also flows through the pilot jet 14 into the chamber 15 and thence to the manifold 15', from which it feeds through the ports 46 of the mounting blocks 44 to the passages 36 of the valve units and into the chambers 37 on the opposite sides of the diaphragms 21, where it acts in a direction tending to close the valves 22. Fuel downstream of the pilot jet 14 also flows by way of the manifold 15' to the pilot discharge conduit 41 and thence through check valve 43 to the pilot discharge nozzle 42.

Under flow conditions, the pressure in manifold 12' is equally applied to all jets 27 and the pilot jet 14, and the pressure set up by check valve 43 is maintained in manifold 15' and is also transmitted to chambers 37 of the respective valve units 16 where it acts on the diaphragms 21 to position the valves 22 in a manner such as to maintain the pressures in chambers 29 and 35 equal to the pressure in manifold 15' in all valve units. Therefore, the drop across each of the jets 27 will be equal to the drop across the pilot jet 14; and if the effective areas of the respective metering jets 27 and pilot jet 14 are equal, the flow to the nozzles 32 will be equal.

Let it be assumed that fuel is flowing and the pressure at the nozzles is fifty p. s. i., which would mean that a like pressure exists in the conduits 31 downstream of the jets 27. Let it also be assumed that the check valve 43 is set to open at 100 p. s. i., which plus the nozzle pressure of fifty p. s. i. would produce a pressure in conduit 15' and chamber 15 downstream of the pilot jet of 150 p. s. i. If we further assume that the drop across the pilot jet is 75 p. s. i., then the pressure in conduit 12' upstream of the metering jets and in chamber 12 upstream of the pilot jet is 225 p. s. i. Suppose that under the foregoing flow conditions, one of the nozzles 32 should become temporarily clogged to the extent that the pressure in its supply conduit 31 increased 25 p. s. i.; then there would immediately be an increase in pressure in the chamber 29 of the particular valve coacting with the clogged nozzle, and a reduction in the drop across the coacting jet 27, which drop would only be momentary since the increase in pressure would be immediately transmitted to the chamber 35 by way of passage 33 and the coacting valve 22 would open to correct the drop across the jet 27 and maintain the flow proportional to all the discharge nozzles. In other words, the distribution of fuel by way of the discharge nozzles becomes a function of the drop across the metering jets and is unaffected by variations in discharge nozzle pressure within the operating range.

Figure 7:
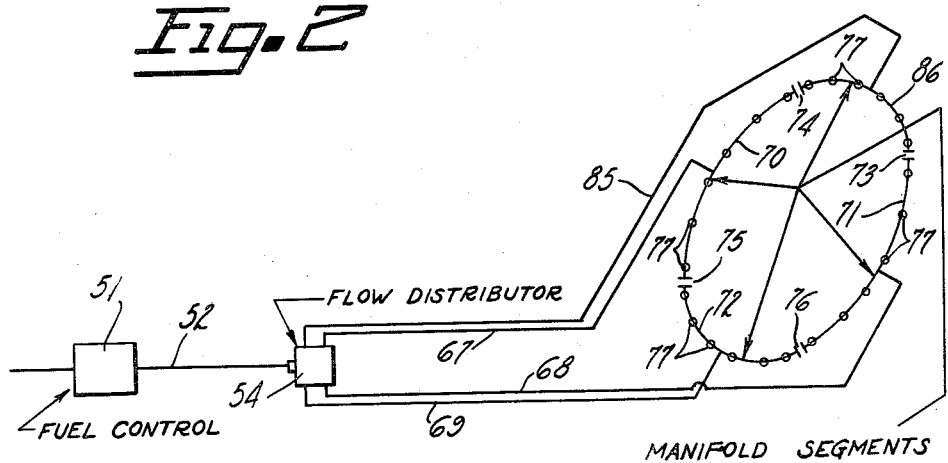
Figure 7 is a schematic view of a gas turbine fuel system embodying the unit of Figures 4, 5 and 6.

Figures 4, 5, 6, and 7 illustrate a flow distributor unit 50 embodying a plurality of regulators in a single package or housing for distributing fuel to a plurality of nozzles on a manifold which may be divided into segments and a single regulator used for the nozzles of each segment. In the diagram of Figure 7, a fuel control device is indicated at 51, from which metered fuel flows by way of conduit 52 to the inlet port 53, Figure 6, of the flow distributor unit 50, the latter in this instance incorporating three flow distributor or regulator valve assemblies generally indicated at 54 and a check valve assembly generally indicated at 55. Since the valve assemblies 54 are similar, only one is shown in the sectional view in Figure 6 and a description of one should suffice for all.

The metered fuel entering the flow distributor unit 50 through conduit 52 flows by way of manifolds 53 and 53' into chambers 56 which communicate with the three flow distributor valves 54 and also a chamber 56' which communicates with a check valve 55. From the chambers 56, fuel flows by way of matched jets 57 (one for each valve assembly 54) to valve chambers 58 where it acts on diaphragms 59 in a direction tending to open valves 60, each of the latter being removably connected to a member 61 secured to and movable with the diaphragm 59. When each valve 60 opens, fuel may flow by way of ports 62 and 62' into outlet passage 63 formed in each of a series of fuel line connectors 64, 65 or 66 (compare Figures 4 and 5) and thence by way of conduits 67, 68 and 69 to segments 70, 71 and 72 of the fuel manifold of Figure 7, the said segments being separated one from the other and from segment 86 at 73, 74, 75 and 76. The fuel nozzles are diagrammatically indicated at 77; they are preferably equally divided among the four segments.

Figure 6:
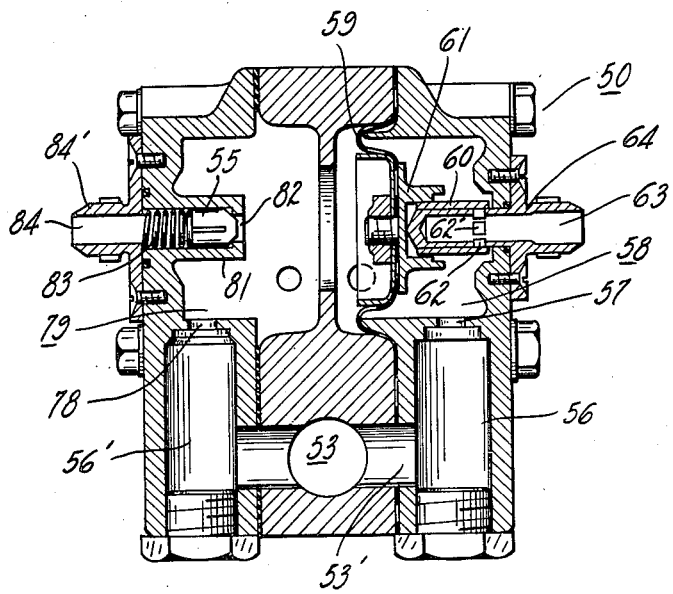
Figure 6 is a section taken on either the line 6—6, Figure 4, or 6—6, Figure 5.

The incoming fuel in chamber 56', note Figure 6, also flows through pilot jet 78 to a chamber 79, which latter chamber is common to the three diaphragms 59 of the flow distributor valves 54 and acts on said diaphragms in a direction tending to close the valves 60. Check valve 55 is mounted in a housing 81 provided with a port 82 controlled by said check valve, the latter opening against the resistance of a spring 83. When the check valve opens, fuel flows through the port 82 and thence by way of outlet passage 84, formed in a fuel line connector 84', and conduit 85 to segment 86 of the fuel manifold of Figure 7.

The operation of the regulator of Figures 4 to 7, inclusive, is substantially similar to that of Figures 1 to 3. The jets 57 and 78 may be matched or have the same effective area. The upstream jet pressure in chamber 56 is common to all jets while the downstream jet pressure in chamber 79 is common to all regulator valve diaphragms 59. As long as the nozzle discharge pressure of all the nozzles supplied by the unit remains at a given value as determined by the selected pilot jet, the pressure on opposite sides of the diaphragms 59 will remain in balance, but should nozzle discharge pressure of any one or more of the nozzles of any manifold segment become disturbed, the pressure in chamber 58 downstream of jet 57 will change and the associated valve 60 will then move to correct the drop across the jet. While the regulator of Figures 4 to 7 has the advantages of simplicity in installation and probably maintenance, it does not correct for malfunctioning of each nozzle separately but affects a group of nozzles even though only one of the group may be out of line.

It will be understood that certain limited changes in construction, design and mode of use may be made within the scope of the invention as defined by the appended claims.

I claim:

1. In an automatic flow regulating system for fluids, a header or manifold adapted to receive the fluid to be regulated and having a plurality of flow passages branching therefrom and terminating at individual points of discharge, a regulating valve in each branch passage upstream of said points of discharge, a metering jet in each branch conduit upstream of each valve, a pressure responsive element operatively connected to each valve, means for communicating pressure downstream of said branch metering jets to one side of each of said elements, one of said branch passages functioning to communicate a common regulating pressure to the opposite side of each element and having a master or pilot metering jet therein, said pilot jet being of predetermined effective area relative to the branch jets to maintain the pressure on opposite sides of said elements at a given value or values and thereby cause said regulating valves to assume positions determined by the drop across said pilot jet and branch jets, any variation of the discharge pressure at any one or more of said points of discharge from the value as determined by the drop across its coacting branch jet and the pilot jet causing the coacting valves to move to positions which automatically correct the drop across the branch jet or jets and distribute the flow as predetermined by jet area to all points of discharge.

2. In an automatic flow regulating system for fluids, a header or manifold adapted to receive the fluid to be regulated and having a plurality of flow passages branching therefrom and terminating at individual points of discharge, a regulating valve upstream of each of said points of discharge, a metering jet in each of said branch conduits upstream of each valve, a pressure responsive element operatively connected to each valve, means for communicating downstream jet pressure to one side of each of said elements, the jet in one of said branch passages functioning as a pilot metering jet, means for communicating fluid pressure downstream of said pilot jet to the opposite sides of said elements, said jets including the pilot jet being of substantially equal effective area, unequal discharge pressure at any one or more of said points of discharge unbalancing the pressure across said elements and causing the coacting regulating valve to move to a position to correct the drop across its coacting branch metering jet and maintain flows equal to all points of discharge.

3. In an automatic flow regulating system for fluids, a header or manifold adapted to receive the fluid to be regulated and having a plurality of flow passages branching therefrom and terminating in discharge nozzles, a regulating valve in each of said branch passages upstream of said nozzles, a metering jet in each of said branch passages upstream of each valve, means providing a pilot pressure chamber and a branch pressure chamber including a movable element such as a diaphragm operatively connected to each valve and having its opposite sides exposed to the pressures in said chambers, a passage communicating pressure downstream of each of said branch jets to its coacting branch pressure chamber and such pressure acting in a direction tending to open its coacting valve, one of said branch passages functioning as a pilot passage and having a pilot jet therein, said pilot passage communicating downstream of said pilot jet with said pilot pressure chambers and producing a common pilot pressure acting in a direction tending to close said valves, said jets including the pilot jet being of substantially equal effective area, unequal discharge pressures at any one or more of said nozzles unbalancing the pressure across said elements, causing the regulating valves to automatically assume positions for equal distribution of fluid to all of said nozzles.

4. In an automatic flow regulating system for fluids, a header or manifold adapted to receive the fluid to be regulated and having a plurality of flow passages branching therefrom and terminating in discharge nozzles, a metering jet in each of said branch passages, means defining a pilot pressure chamber and a branch pressure chamber including a pressure responsive element constituting a movable wall between said chambers, a regulating valve operatively connected to each of said elements, a passage downstream of each of said branch metering jets for communicating downstream jet pressure to each of said branch chambers in a direction tending to open said valves, one of said branch passages constituting a pilot conduit and being in communication with said pilot chambers to communicate a common regulating pressure to said pilot chambers in a direction tending to close said valves, a pilot metering jet in said pilot conduit between said pilot chambers and said manifold, said pilot conduit functioning to supply fuel to a pilot discharge nozzle, valve means in said pilot conduit between the pilot jet and the pilot discharge nozzle for maintaining a predetermined pressure in the pilot conduit above pilot discharge nozzle pressure, said jets including said pilot metering jet being of substantially equal effective area, unequal discharge pressure at any one or more of said nozzles unbalancing the pressure across said elements and causing the regulating valves to move to positions in relation to the drop across said jets and correct for unequal distribution of flow to said nozzles.

5. In an automatic flow regulating system for liquid fuel wherein the fuel is conducted under pressure from a common source to a manifold and thence to a plurality of discharge nozzles, regulating valves upstream of said nozzles, a metering jet upstream of each valve, a pressure responsive element connected to each valve and subjected in a valve opening direction to the pressure of fuel downstream of the coacting metering jet, a pilot discharge nozzle, one of said jets constituting a pilot jet through which fuel flows to said pilot nozzle, a pilot conduit arranged to subject said elements in a valve closing direction to the pressure of fuel downstream of said pilot jet, one of said regulating valves functioning as a check valve between said pilot jet and said pilot nozzle for maintaining a predetermined pressure in said pilot conduit above pilot discharge nozzle pressure, said jets including the pilot jet being of substantially equal effective area, any disturbance in the normal operation of any one or more of the discharge nozzles momentarily producing a differential across said elements tending to move the regulating valves to positions which correct the drop across the coacting metering jet or jets and automatically distribute the flow equally among the entire group of nozzles.

6. A system as claimed in claim 5 wherein the manifold is divided into separate sections with a group of nozzles to each section and there is a single regulating valve assigned to each group.

7. A system as claimed in claim 5 wherein the manifold is divided into separate sections and a plurality of regulating valves and a check valve are housed in a single unit and separate conduits communicate said valves with the respective sections.

THOMAS J. THOMPSON.

REFERENCES CITED

The following references are of record in the file of this patent:

UNITED STATES PATENTS

| Number | Name | Date |
| --- | --- | --- |
| 1,272,212 | Callan | July 9, 1918 |
| 2,070,004 | Davis | Feb. 9, 1937 |
| 2,283,266 | Kinsella | May 19, 1942 |
| 2,313,797 | Bailey | Mar. 16, 1943 |
| 2,334,679 | Mason et al. | Nov. 16, 1943 |
| 2,430,264 | Wiegand et al. | Nov. 4, 1947 |

FOREIGN PATENTS

| Number | Country | Date |
| --- | --- | --- |
| 577,132 | Great Britain | May 7, 1946 |